United States Patent [19]

Lange

[11] Patent Number: 4,984,893

[45] Date of Patent: Jan. 15, 1991

[54] PHASE SHIFTING DEVICE AND METHOD

[75] Inventor: Steven R. Lange, Tucson, Ariz.

[73] Assignee: Wyko Corporation, Tucson, Ariz.

[21] Appl. No.: 444,542

[22] Filed: Dec. 1, 1989

[51] Int. Cl.$^5$ ............................................. G01B 11/24
[52] U.S. Cl. ................................ 356/376; 250/237 G
[58] Field of Search ....................... 356/375, 376, 1, 2; 250/237 G

[56] References Cited

U.S. PATENT DOCUMENTS

| | | | |
|---|---|---|---|
| 4,212,073 | 7/1980 | Balasubramanian | 364/562 |
| 4,231,662 | 11/1980 | Feinland et al. | 356/373 |
| 4,657,393 | 4/1987 | Stern | 356/376 |
| 4,657,394 | 4/1987 | Halioua | 356/376 |

OTHER PUBLICATIONS

"Use of Electronic Phase Measurement Techniques In Optical Testing", by J. Wyant and R. Shagam, *Proceedings of ICO*-11 Conference, Madrid, Spain, 1978, pp. 659–662.

"Optical Frequency Shifter For Heterodyne Interferometers Using Multiple Rotating Polarization Retarders", by R. Shagam and J. Wyant, *Applied Optics*, vol. 17, No. 19, Oct. 1978, pp. 3034–3035.

"Interferometric Optical Metrology: Basic Principles and New Systems", by J. Wyant, *Laser Focus*, May 1982, pp. 65–71.

"Adaptation of a Parallel Architecture Computer to Phase Shifted Moire Interferometry", by A. Boehnlein and K. Harding, SPIE, vol. 728, *Optics, Illumination, and Image Sensing for Machine Vision*, 1986, pp. 183–194.

*Primary Examiner*—F. L. Evans
*Attorney, Agent, or Firm*—Cahill, Sutton & Thomas

[57] ABSTRACT

A phase shifting projector includes an incandescent lamp, a heat-absorbing filter filtering infrared light from the incandescent lamp, a condensing lens receiving light from the filter, a transparent slide having a sinusoidal grating thereon, a projecting lens, a rotatable transparent plate disposed between the slide and the projecting lens, a test surface on which the grating is projected, and a stepper motor connected to the transparent plate for rotating it about an axis generally parallel to a line of the grating to modulate the phase of the grating image projected on the test surface.

17 Claims, 2 Drawing Sheets

U.S. Patent   Jan. 15, 1991   Sheet 1 of 2   4,984,893
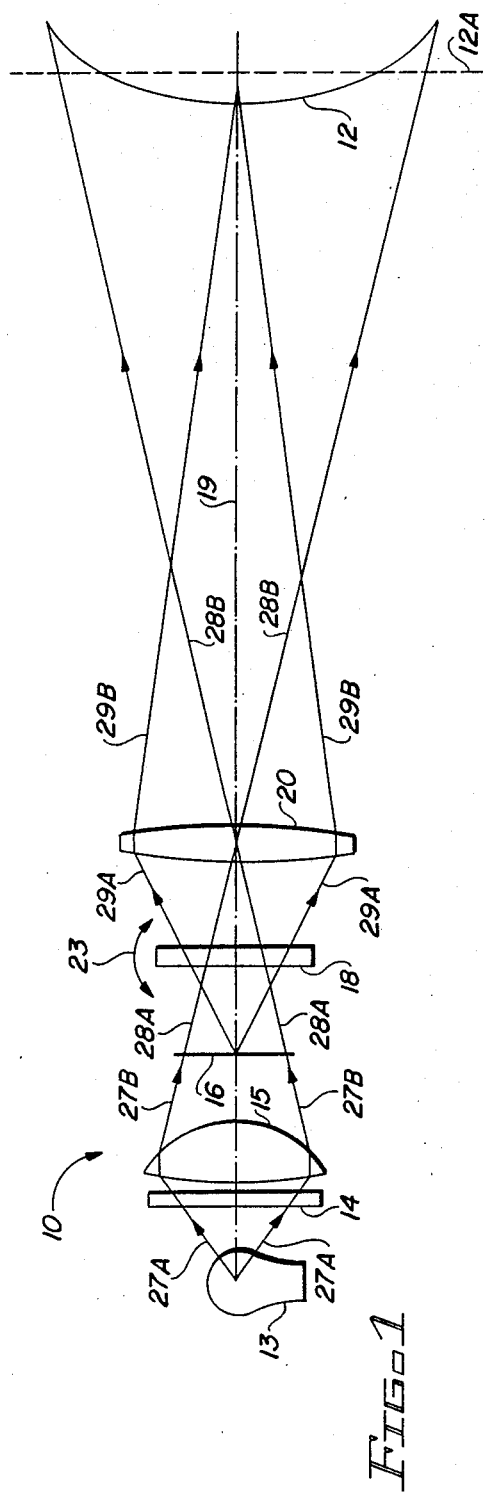
FIG. 1
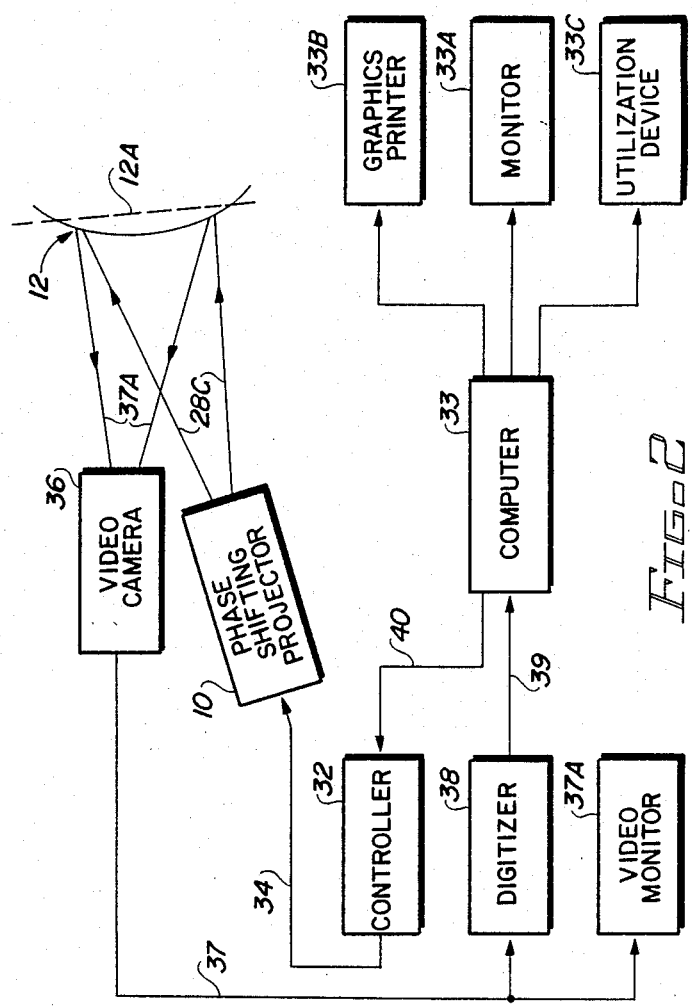
FIG. 2
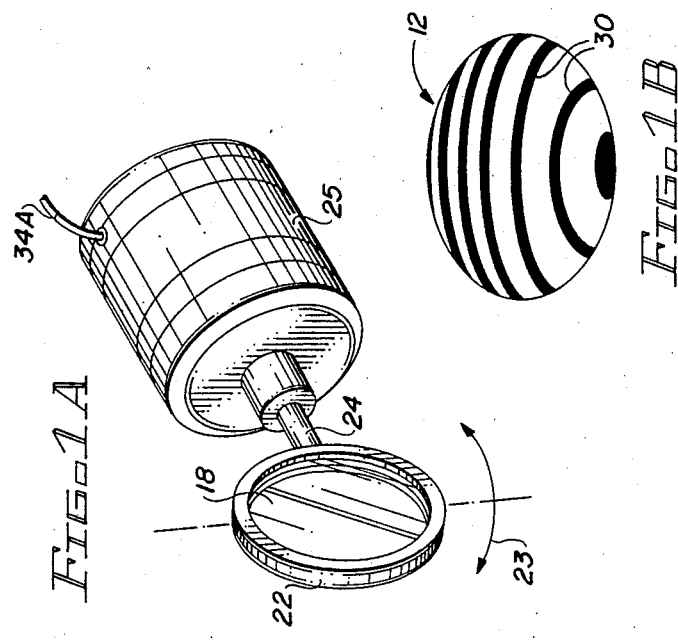
FIG. 1A
FIG. 1B

PHASE SHIFTING DEVICE AND METHOD

BACKGROUND OF THE INVENTION

The invention relates to phase shifting devices, and more particularly to a phase shifting device for projected fringe contouring without the need for expensive, highly accurate mechanical components required in prior phase shifting devices.

Surface profile measurement by non-contact optical methods has been extensively studied because of its importance in fields such as automated manufacturing, component quality control, medicine, robotics, solid modeling applications, and other fields. In most of the known methods, a known periodic pattern, such as a sinusoidal grating, is projected on the surface to be measured. The image of the grating is deformed by features of the surface, detected, and analyzed by various well known techniques to determine the profile of the surface. For example, see U.S. Pat. No. 4,641,972, issued 2/10/87 to Halioua, et al.

The projected grating usually includes either a pattern of straight, parallel grid lines or a pattern of straight, parallel, sinusoidally varying intensity grid lines. If the test surface departs from being flat, then the image viewed by the detector or camera will have curved and/or non-parallel non-equally-spaced intensity patterns. The degree of departure of the curved and/or non-parallel, non-equally-spaced intensity patterns observed by the camera or detector from the projected grating pattern is mathematically related to the height of the test object relative to a flat reference surface. If the angle between the projector and the camera is known and other geometrical factors such as the distance from the camera to the test object and the distance from the projector to the test object are measured, then the height distribution of the test object can be calculated.

Phase shifting projectors used for projected fringe contouring generally are simple slide projectors, with the slide having therein a grating pattern with sinusoidally varying intensity. This type of slide projector is much less expensive and produces more illumination than laser-based interferometric projectors, which also can be used. The phase modulation required for the slide projector can be accomplished using a high precision mechanical device to translate the slide laterally relative to the incident beam of the projector. The period of the grating is typically less than 500 microns, and movements of the grating typically have to be less than 125 microns per acquired video frame, with a positional accuracy of about 2-3 microns for each step. Such prior slide projectors for projected fringe contouring apparatus require complex, high precision, expensive mechanical devices to achieve shifting of the grating slide with this level of accuracy.

Thus, there is a need for an improved, simplified phase shifter of lower complexity and lower cost than the phase modulating projectors used in prior projected fringe contouring devices.

SUMMARY OF THE INVENTION

Accordingly, it is an object of the invention to provide an inexpensive, high precision phase shifting device for producing accurate transverse shifts of a grating.

It is another object of the invention to provide precise phase shifts of a projected grating without a requirement of critical alignment or calibration procedures.

It is another object of the invention to provide a phase shifting projector without contacting or moving the main optical parts of the projector.

Briefly described, and in accordance with one embodiment thereof, the invention provides an apparatus and technique for modulating the phase of a projected grating by use of a rotating glass plate tilted about an axis that is generally parallel to the grid lines of the grating. In the described embodiment, a phase shifting slide projector includes an incandescent lamp, a heat-absorbing filter for filtering infrared light from the incandescent lamp, a condensing lens receiving light from the filter, a transparent slide having a sinusoidal grating thereon, a projecting lens, a rotatable transparent plate disposed between the slide and the projecting lens, a test surface on which the grating is projected, and a mechanism coupled to the transparent plate for rotating it about an axis that is generally parallel to a line of the grating. The transparent plate thereby is rotated through a plurality of selected angles to provide rapid, accurate modulation of the phase of the grating projected on the test surface.

BRIEF DESCRIPTION OF THE DRAWINGS

FIG. 1 is a schematic diagram of the phase shifting projector of the present invention.

FIG. 1A is a perspective diagram of a stepper motor connected to rotate a glass plate in FIG. 1, producing a phase shift of projected grating in the projector of FIG. 1.

FIG. 1B is a plan view of a deformed grating image appearing on the test surface of FIG. 1.

FIG. 2 is a block diagram of a projected fringe contouring system utilizing the phase shifting projector of FIG. 1.

DETAILED DESCRIPTION OF THE PREFERRED EMBODIMENT

Figure 3:
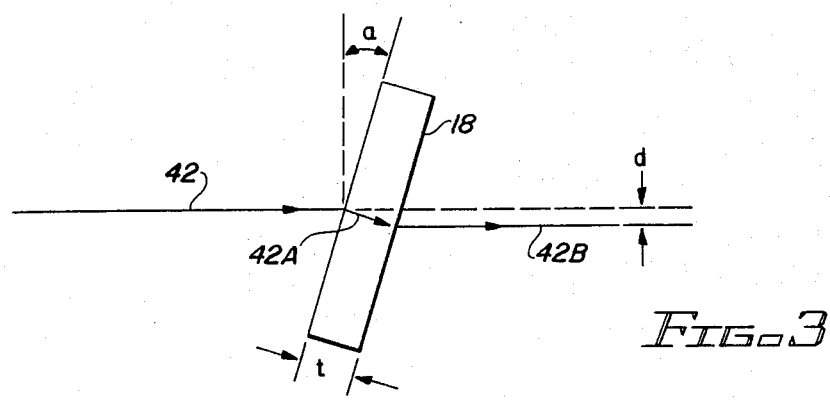
FIG. 3 is a diagram useful in explaining the operation of a rotating glass plate by means of which phase shifting is accomplished in the system of FIG. 1.

Referring to FIG. 1, phase shifting projector 10 includes an incandescent lamp 13 (or other suitable light source), a heat absorbing filter 14, a condensing lens 15, a rotatable glass plate 18, and a projecting lens 20 all optically aligned along an axis 19. A test surface 12, which in the illustration is spherical but can be of any shape, also is aligned with axis 19. Incandescent lamp 13 produces substantial infrared radiation which is absorbed by the heat absorbing filter 14, in order to prevent heat damage to the components located to the right of infrared filter 14. Numerals 27A designate the beam emitted by the filament of incandescent lamp 13. Beam 27A passes through condensing lens 15 to produce converging beam 27B. A flat slide with a horizontal sinusoidal grating is located near the rear focal plane of projecting lens 20. Converging beam 27B passes through sinusoidal grating 16 to produce beam 28A, which passes through projecting lens 20 to produce diverging projected grating rays 28C.

Similarly, rays 29A are projected by sinusoidal grating 16 to the peripheral portions of projecting lens 20 to produce converging projected grating rays 29B. The location of slide 16 relative to lens 20 is such as to form an image of slide 16 at the average location 12A of test surface 12.

Thus, slide projector 10 projects a sinusoidal grating 16 onto semi-spherical (or other shape) test surface 12, a plan view of which is shown in FIG. 1B. In FIG. 1B, numeral 30 indicates the deformed project grating image on the semispherical test surface 12.

In accordance with the present invention, shifting of the phase of the projected sinusoidal grating image of grating 16 is produced by rotating flat glass plate 18 about an axis parallel to the grid lines of sinusoidal grating 16. In the present embodiment of the invention, this is accomplished by supporting glass plate 18 in a frame 22 and rotating it about a horizontal axis coincident with shaft 24 of a stepper motor 25. Stepper motor 25 is controlled by signals 34A from a controller 32 shown in FIG. 2. Stepper motor 25 can conveniently tilt mirror 18 by an angle of ±20 degrees with a high degree of precision.

Referring now to FIG. 2, a projected fringe contouring system 31 is shown which incorporates phase shifting projector 10 of FIG. 1. Projected fringe contouring system 31 includes a computer 33 that receives digitized image data 39 produced by a digitizer 38 in response to analog video information received from a video camera 36. Video camera 36 views an image produced on test surface 12 by phase shifting projector 10. Phase shifting projector 10 receives signals 34 from a controller 32. Controller 32 receives control signals 40 from computer 33. The video monitor 37A allows direct viewing of the output of video camera 36. Monitor 33A and graphic printer 33B are driven by computer 33 to produce displays of the topography and analysis data of test surface 12. In some cases, analysis data can be input directly to a utilization device 33C.

Except for phase shifting projector 10, all of the components in FIG. 2 are readily available and easily implementable by one skilled in the art. Computer 33 may be any suitable computer, such as an IBM PC-AT, used in a number of the assignee's non-contact profiling products (such as the Wyko "PHASE II"). Computer 33 can compute the phase and height of each point on the test surface 12 relative to a reference plane such as 12A using any of a number of well known algorithms. For example, see commonly assigned U.S. Pat. No. 4,639,139, issued Jan. 27, 1987, by James Wyant and Keith Prettyjohns, entitled "OPTICAL PROFILER USING IMPROVED PHASE SHIFTING INTERFEROMETRY". Computer 33 actually contains a publicly available five frame phase shifting algorithm that is used in a number of the assignee's products for shifting the phase of light projected on a test surface, evaluating the image viewed thereon to calculate the phase of each point and, from the calculated phase, to further calculate the heighth of each point of the test surface relative to a reference plane.

Controller 32 in FIG. 2 is a simple circuit that simply receives signals from the computer and converts them into drive signals for the stepper motor 25 in the phase shifting projector 10. Controller 32 can be implemented by means of a commercially available "Local Applications Bus" printed circuit board marketed under the trademark "LAB 40". Digitizer 38 can be a "PUBLISHERS VGA", available from Willow Peripherals, Inc. of New York. Video camera 36 continually views the test surface 12, sending its video signal to digitizer 38. Shifting of the phase of the projected sinusoidal grating 16 by stepped rotation of glass plate 18 is synchronized with the digitized video data 39 received by computer 33 from digitizer 38.

In the described embodiment of the invention, phase shifting projector 10 is instructed by computer 33 to transversely (to axis 19) shift the phase of the projected sinusoidal grating onto test surface 12 in discreet steps between each captured frame of video. Alternately, phase shifting projector 10 can be instructed to shift the phase of the projected sinusoidal grating in a linear manner while the video camera is integrating light during a frame, possibly resulting in faster performance.

Referring to FIG. 3, glass plate 18 is illustrated as being tilted by an angle "a" relative to axis 19. The thickness of glass plate 18 is "t", and its index of refraction is "n". The displacement of an incident ray 42 along axis 19 is given by the following equation:

$$d = t * sin(a) \left[ 1 - \cos\left( \frac{a}{(n^2 - \sin^2(a))^{\frac{1}{2}}} \right) \right] \quad (1)$$

In the design of phase shifting projector 10, care must be taken to avoid adding too much optical aberration to the projection optics. A tilted glass plate in a diverging optical beam produces various amounts of spherical, coma, and astigmatism aberrations to the optical image. The thicker the plate 18 and the larger the tilt angle "a", the greater the magnitude of the added aberrations. The product designer must check the optical design of the image of the phase shifting projector to determine if the added aberrations are tolerable in their effects on the projected image.

A number of methods can be employed to rotate glass plate 18. The most direct method is to attach glass plate 18 to a galvo scanner and use a driver circuit to move plate 18 to the desired angle for each frame of data. This technique has the advantage of following the non-linear displacement versus tilt equation and can also operate in a continuous scanning mode.

In the technique of attaching the glass plate 18 to the axle of a stepper motor, the angular increments are preselected as an integral number of stepper motor steps between frames. The thickness and index of refraction of glass plate 18 are variables that are available to match the motion to a particular grating period. In the above example, a tolerance of 0.23 degrees tilt was needed for a 2 degree phase tolerance, which is large in comparison to a 1.8 degree standard step-to-step motion of a stepper motor. By keeping the tilt angle small, the glass plate thickness large, and operating the tilt of the plate on both sides of a zero tilt reference angle, the stepper motor can be used quite well to give nearly equal phase steps.

Although ordinarily the phase shift between frames of video would be in 90 degree increments of the sinusoidal grating period, actually almost any angle could be used. A typical example for a sinusoidal grating has a period of 0.5 millimeters with a quarter period equal to 0.125 millimeteres corresponding to 90 degrees of phase translation of the sinusoidal grating to be achieved by tilting of the glass plate 18. The glass plate is assumed to have an index of refraction of 1.5, a thickness of 2.0 millimeters. Then, in accordance with equation (1), an angle of 10.6 degrees tilt of the glass plate 18 is required to move the projected sinusoidal grating pattern by 0.125 millimeters. If the tolerance requires that the phase shift be accurate to 90 degrees ±2 degrees of phase, then the effective tolerance of the rotation of the glass plate is 0.23 degrees.

Figure 4A:
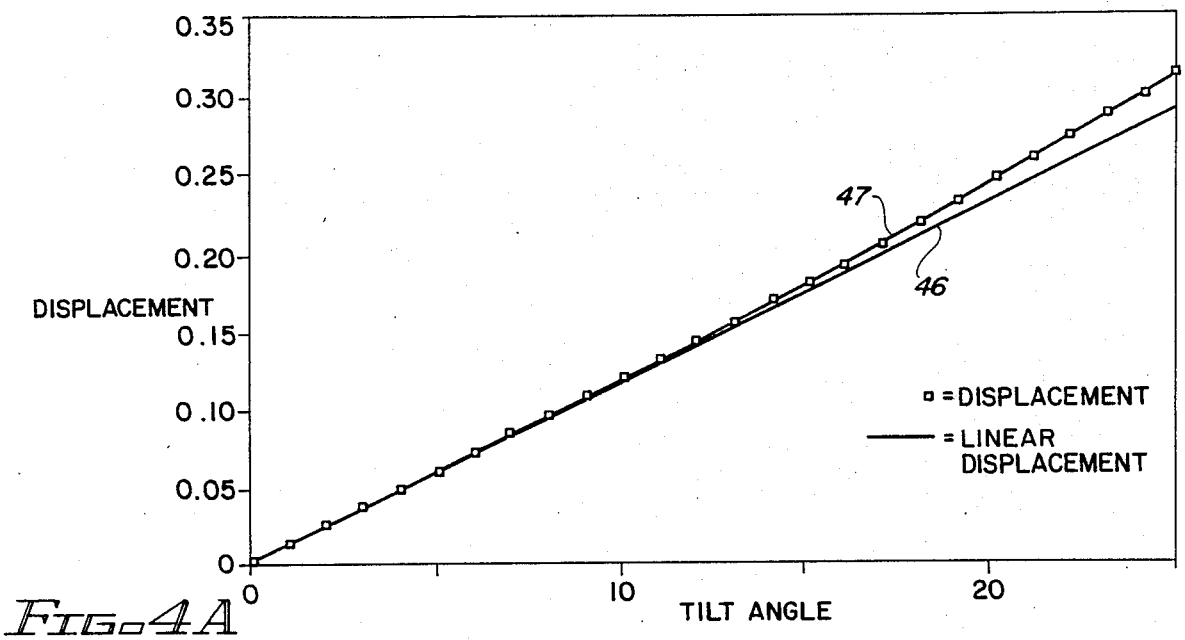
FIGS. 4A and 4B disclose graphs useful in describing the degree of linearity of the phase shifting projector of FIG. 1 as a function of number of degrees of rotation of the glass plate.
Figure 4B:
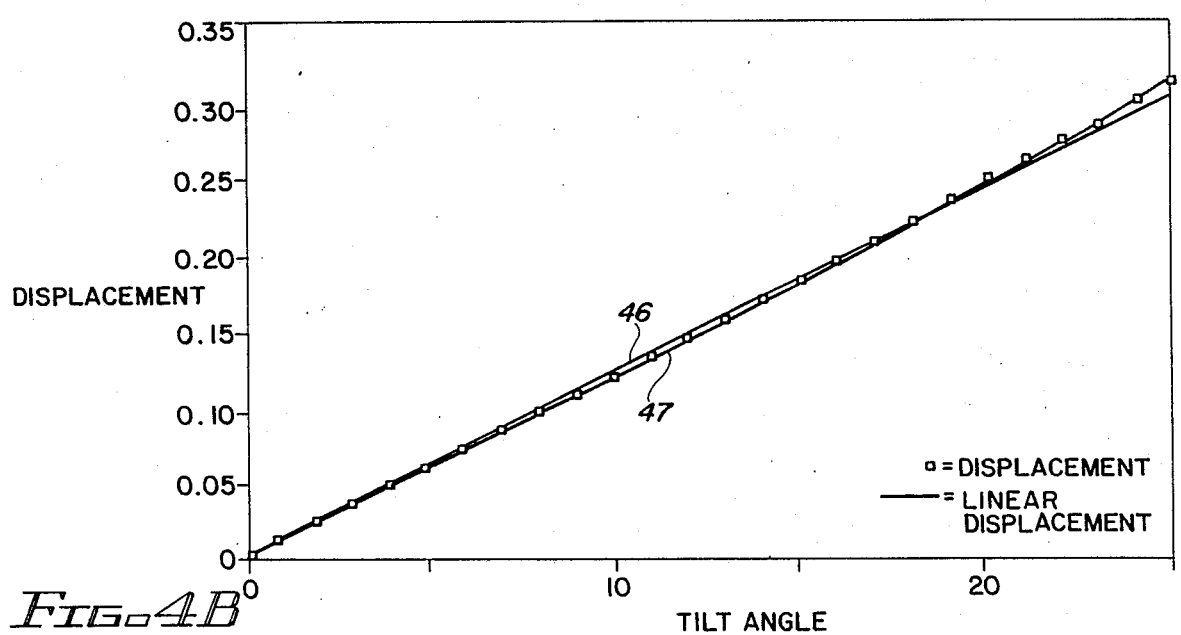

Displacement equation (1) is not linear. Therefore, any mechanism for producing rotation of glass plate 18 should take this into account. FIG. 4A illustrates a curve 47 indicating transverse displacement d as a function of tilt angle compared to a straight line 46, for the above example. FIG. 5 utilizes the same displacement data as in FIG. 4A and compares it to a "best linear fit" to the straight line 46 for tilt angles less than about 10 degrees.

It should be noted that it is desirable to keep the tilt angle or rotation angle small, as a linear response is desired. This can be accomplished by increasing the thickness t of glass plate 18 or increasing the index of refraction n.

It should be noted that the above-described phase shifting projector is much more mechanically stable than a laser-based fringe projector, because interferometers are far more sensitive to minute mechanical dimension changes caused by, for example, temperature variations, mechanical vibrations, or mechanical stress.

While the invention has been described with reference to several particular embodiments thereof, those skilled in the art will be able to make the various modifications to the described embodiments of the invention without departing from the true spirit and scope of the invention. It is intended that all elements and steps which perform substantially the same function in substantially the same manner to achieve the same result are within the scope of the invention.

What is claimed is:

1. A phase shifting projector comprising in combination:
    (a) a light source;
    (b) a condensing lens receiving light from the light source;
    (c) a transparent slide having a grating thereon;
    (d) a projecting lens;
    (e) a flat rotatable transparent plate disposed between the slide and the projecting lens;
    (f) a test surface on which the grating is projected;
    (g) means coupled to the transparent plate for rotating it about an axis having a fixed angular relationship to a line of the grating through a plurality of selected angles to modulate the phase of an image of the grating projected on the test surface.

2. The phase shifting projector of claim 1 wherein the rotating means includes a stepper motor having an axle, and means rigidly attached to the axle and the transparent plate for supporting the transparent plate.

3. The phase shifting projector of claim 1 wherein the transparent plate is composed of glass.

4. A phase shifting projector comprising in combination:
    (a) an incandescent lamp;
    (b) a heat-absorbing filter filtering infrared light from the incandescent lamp;
    (c) a condensing lens receiving light from the filter;
    (d) a transparent slide having a sinusoidal grating thereon;
    (e) a projecting lens;
    (f) a rotatable transparent plate disposed between the slide and the projecting lens;
    (g) a test surface on which the grating is projected;
    (h) means coupled to the transparent plate for rotating it about an axis generally parallel to a line of the grating through a plurality of selected angles to modulate the phase of an image of the grating projected on the test surface.

5. A projected fringe contouring non-contact profiler, comprising in combination:
    (a) a phase shifting projector including
        i. a light source,
        ii. a condensing lens receiving light from the light source,
        iii. a transparent slide having a grating thereon,
        iv. a projecting lens,
        v. a flat rotatable transparent plate disposed between the slide and the projecting lens,
        vi. a test surface on which the grating is projected,
        vii. control means coupled to the transparent plate for rotating it about an axis having a fixed angular relationship to a line of the grating through a plurality of selected angles to modulate the phase of an image of the grating projected on the test surface, the phase shifting projector projecting an image of the grating onto a test surface,
    (b) detecting means for receiving the image of the grating projected onto the test surface and producing data representative thereof;
    (c) computing means for controlling rotation of the transparent plate;
    (d) means for coupling the computing means to the control means to effectuate the modulation of the phase of the projected image of the grating in response to the data produced by the detecting means;
    (e) means in the computing means for computing the height of each of a plurality of points on the test surface relative to a reference surface in response to the data produced by the detecting means.

6. The projected fringe contouring non-contact profiler of claim 5 wherein the detecting means includes a video camera, the projected fringe contouring non-contact profiler further including a digitizer for receiving video data from the video camera and transmitting digital data to the computing means.

7. The projected fringe contouring non-contact profiler of claim 6 wherein the computing means includes means for producing control signals synchronized with video data received from the video camera to thereby synchronize modulation of the phase of the image of the grating projected onto the test surface with the video data.

8. The projected fringe contouring non-contact profiler of claim 7 wherein the control means includes a stepper motor having an axle, and means rigidly attached to the axle on the transparent plate for supporting the transparent plate.

9. The projected fringe contouring non-contact profiler of claim 8 wherein the transparent plate is composed of glass.

10. A method of shifting the phase of a projected grating image of a sinusoidally varying intensity in a projector, the method comprising the steps of:
    (a) directing a beam from a light source to a condensing lens;
    (b) directing light from the condensing lens through a grating pattern;
    (c) directing a resulting projected grating image through a projecting lens;

(d) directing the projected grating image through a rotatable transparent plate disposed between the grating pattern and the projecting lens and onto a test surface on which the grating pattern is projected;

(e) modulating the phase of an image of the grating projected on the test surface by rotating the transparent plate about an axis having a fixed angular relationship to a line of the grating pattern.

11. The method of claim 10 including rotating the transparent plate by means of a stepper motor having an axle and means rigidly attached to the axle and the transparent plate to support the transparent plate.

12. A method of using a projected fringe contouring non-contact profiler, comprising the steps of:

(a) directing light from a source into a condensing lens;

(b) directing light focused by the condensing lens through a grating pattern having a sinusoidal intensity variation and then through a projecting lens to produce a projected grating image;

(c) modulating the phase of the projected grating image by rotating a flat rotatable transparent plate disposed between the grating pattern and the projecting lens about an axis having a fixed angular relationship to a line of the grating pattern;

(d) directing a resulting modulated projected grating image onto a test surface;

(e) detecting the grating image on the test surface and producing image data;

(f) controlling the rotation of the plate;

(g) computing a relative height of each of a plurality of points on the test surface from the image data.

13. The method of claim 12 wherein step (e) includes receiving the grating image in a video camera, producing a video signal with the video camera, digitizing the video signal by means of a digitizer, and transmitting digital data to a computer.

14. The method of claim 13 including operating the computer to cause it to produce control signals synchronized with the video signal to thereby synchronize modulation of the phase of the grating image projected onto the test surface.

15. The method of claim 12 wherein step (c) includes rotating the plate by means of a stepper motor having an axle rigidly attached to the plate.

16. A phase shifting projector comprising in combination:

(a) a light source;

(b) a condensing lens receiving light from the light source;

(c) a grating;

(d) a projecting lens;

(e) a rotatable transparent plate disposed between the grating and the projecting lens;

(f) a test surface on which the grating is projected;

(g) means coupled to the transparent plate for rotating it about an axis having a fixed angular relationship to a line of the grating through a plurality of selected angles to modulate the phase of an image of the grating projected on the test surface.

17. A projected fringe contouring non-contact profiler, comprising in combination:

(a) a phase shifting projector including
  i. a light source,
  ii. a condensing lens receiving light from the light source,
  iii. a transparent slide having a grating thereon,
  iv. a projecting lens,
  v. a flat rotatable transparent plate disposed between the slide and the projecting lens,
  vi. a test surface on which the grating is projected,
  vii. control means coupled to the transparent plate for rotating it about an axis having a fixed angular relationship to a line of the grating through a plurality of selected angles to modulate the phase of an image of the grating projected on the test surface, the phase shifting projector projecting an image of the grating onto a test surface, (b) detecting means for receiving the image of the grating projected onto the test surface and producing data representative thereof;

(c) control means for controlling a rotation rate of the transparent plate;

(d) means for coupling a computing means to the control means to effectuate the modulation of the phase of the projected image of the grating;

(e) means in the computing means for computing the height of each of a plurality of points on the test surface relative to a reference surface in response to the data produced by the detecting means.

* * * * *